J. T. HENTHORN & B. D. THAYER,
Assignors, by mesne assignments, to THE AMERICAN SHIP WINDLASS CO.
Capstan.
No. 8,511. Reissued Dec. 3, 1878.
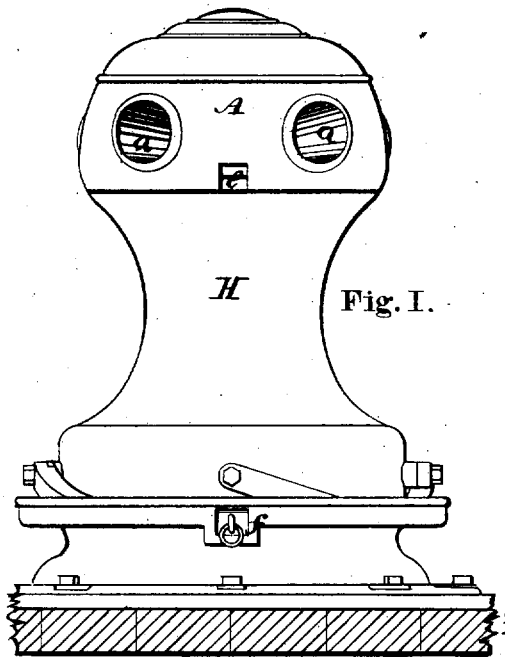
Fig. I.
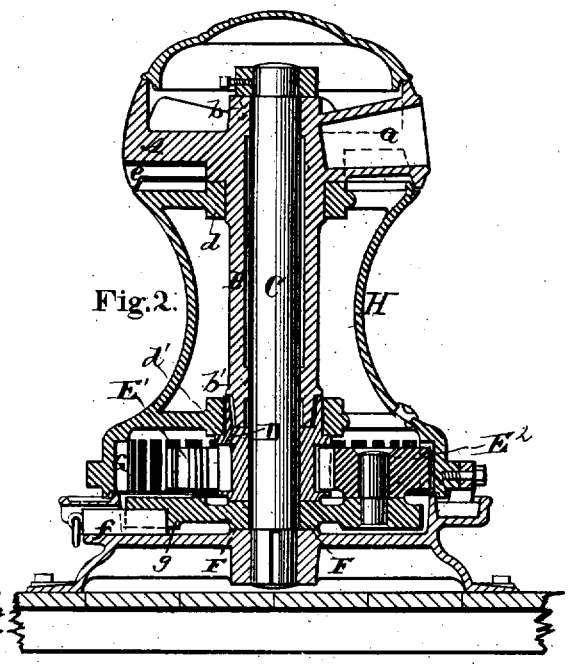
Fig. 2.
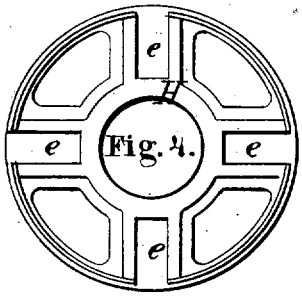
Fig. 4.
Fig. 5.
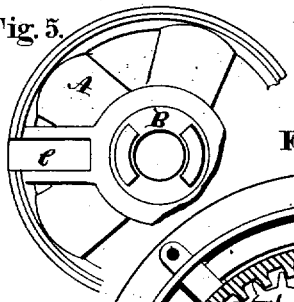
Fig. 3.
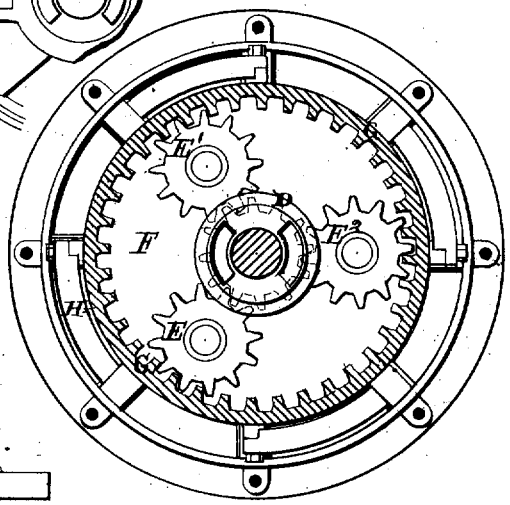
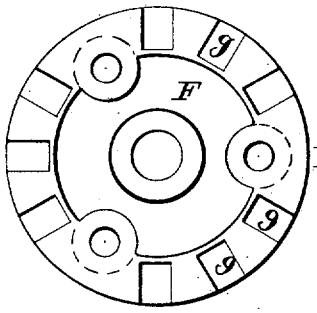
Fig. 6.
Fig. 7.
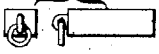
WITNESSES
Joseph A. Miller Jr.
William L. Cooper
INVENTORS
John T. Henthorn
Barton D. Thayer
by Jos. A. Miller attorney
N. PETERS, PHOTO-LITHOGRAPHER, WASHINGTON, D. C.

UNITED STATES PATENT OFFICE.

JOHN T. HENTHORN, OF PROVIDENCE, R. I., AND BARTON D. THAYER, OF NEW YORK, N. Y., ASSIGNORS, BY MESNE ASSIGNMENTS, TO THE AMERICAN SHIP WINDLASS COMPANY, OF PROVIDENCE, R. I.

IMPROVEMENT IN CAPSTANS.

Specification forming part of Letters Patent No. 147,557, dated February 17, 1874; Reissue No. 8,511, dated December 3, 1878; application filed September 18, 1878.

*To all whom it may concern:*

Be it known that we, JOHN T. HENTHORN, of Providence, Rhode Island, and BARTON D. THAYER, formerly of the city and county of Providence, and State of Rhode Island, but now of New York city, have invented a new and useful Improvement in Power-Capstans; and we do hereby declare that the following specification, taken in connection with the drawings making a part of the same, is a full, clear, and exact description thereof, which will enable others versed in the art to make and use the same.

Our invention has reference to improvements in ship power-capstans; and consists in the peculiar arrangement, with the driving-head, of a sleeve surrounding the shaft of a capstan and turning freely on the same, a central pinion connected with the sleeve, but loose on the shaft, arranged to be connected or disconnected with the power-gear, and a barrel turning on the sleeve, the whole arranged so that by a simple manipulation the apparatus may be used as a power-capstan or a simple capstan, and be worked in either direction, as will be more fully set forth hereinafter.

Figure 1 is a view of our improved power-capstan. Fig. 2 is a vertical sectional view of the same through its central axis. Fig. 3 is a horizontal sectional view of the power-gear. Fig. 4 is a sectional view of the capstan-head through the capstan-bar sockets. Fig. 5 is a view of the capstan-head, showing the key-seat. Fig. 6 is a view of the disk carrying the loose or idle pinions, and showing the locking-sockets. Fig. 7 represents the locking-key.

In the drawings, A is the capstan-head, which is furnished with the capstan-bar sockets *a*. This head is furnished with the hollow shaft or sleeve B, which has upper and lower bearings, *b* and *b'*, fitted to the central stationary shaft, C. The lower end of the hollow shaft or sleeve B is tenoned, and the tenons enter mortises in the hub of a toothed wheel or pinion, D, which latter turns freely on the shaft C. E, $E^1$, and $E^2$ are intermediate pinions or idle-gears, which turn freely upon a stud in the circular disk-plate F, Fig. 6, and which latter is free to turn on the shaft C. The intermediate pinions above mentioned engage with the central pinion, D, and also with the teeth of the running-gear G upon the inner face of the capstan-barrel H.

The capstan-barrel is distinct from the capstan-head, and is provided with the upper and lower bearings, *d* and *d'*, which are fitted to the hollow shaft or sleeve B, secured to the capstan-head, or forming an extension to the same, as is shown in Fig. 2.

The central shaft, C, is secured to the base of the circular plate F, slipped over the same. The pinion D, next the barrel H, is now set over the whole, resting on a shoulder of the pinion D. The sleeve B, with the capstan-head, is now passed over the shaft C, and a collar with a set-screw (shown in Fig. 2) is secured to the shaft, and the whole power-capstan is firmly secured by this collar, and a cap is set on the driving-head to exclude water and give a finished appearance to the capstan. It may be readily taken apart, cleaned, repaired, and again set up by any person, requiring neither tools nor skill.

The capstan-head and the capstan-barrel can be locked together by means of a key, (shown in Fig. 7,) when inserted into the mortise-socket *e*, one half of which is cut in the head and the other half in the barrel, as shown in Figs. 1 and 2, and thus the barrel will revolve, with the capstan-head forming a simple capstan. When the key is now inserted through the mortise in the base at F, so that the key will enter into one of the gains *g* in the disk-plate F, the said disk-plate will be prevented from revolving on the shaft C. The effect of thus locking the disk-plate F will be to prevent the intermediate pinions E, $E^1$, and $E^2$ from revolving around the central toothed wheel, D, as they otherwise would do, whereupon, if the capstan-head A be revolved in either direction by means of the capstan-bars, the capstan-barrel will be made to revolve in the opposite direction, but at a rate of speed much less, and with a degree of power as much greater as is due to the difference in the diameters of the driven internal rim-gear, G, on the capstan-barrel and the driving-wheel D, thus forming a power-capstan.

The construction of the capstan is simple, yet strong and durable. It requires little fitting, and, as the compound gearing is at the base and the central shaft rigidly fixed, the capstan can withstand the most severe strains.

Having thus described our invention, we claim as new and desire to secure by Letters Patent—

1. The combination, with the fixed central shaft, C, of the gear D, provided with recesses or sockets in its upper surface, and the driving-head, provided with a sleeve, B, the lower end of which is adapted to engage within the recesses in the gear D, substantially as set forth.

2. The combination, with the fixed central shaft, C, the gear D, and driving-head, provided with a sleeve, constructed to engage with gear D, of the disk-plate F, loosely mounted on the shaft C, and means for locking said disk-plate to the base of the capstan, substantially as set forth.

3. The combination, with the fixed central shaft, C, of the gear-wheel D, loose on the shaft, and driven by the sleeve B, the intermediate gear E, (one or more of them,) the disk-plate F, arranged to be locked to the base, and the barrel H, provided with the toothed rim G, the whole arranged and operated substantially as and for the purposes set forth.

4. The combination, with a central shaft, of a capstan-head provided with an axial sleeve, a driving-gear, loose on the shaft, and driven by the sleeve, a barrel, mounted on said sleeve, and provided with an internal gear, a disk-plate carrying pinions, which connect said driving-gear with the barrel-gear, and a locking device, whereby said disk-plate may be prevented from rotating, substantially as described.

5. The combination, with a fixed central shaft, of the disk-plate F, gear D, arranged to actuate the power-gears, hollow sleeve B, and capstan-head A, all loose on the central shaft, with the barrel H and a locking device, by which the barrel may be locked to the capstan-head, or the disk F to the base, substantially as and for the purposes set forth.

JOHN T. HENTHORN.
BARTON D. THAYER.

Witnesses:
E. R. ROOT,
GEO. E. KING,
JOSEPH A. MILLER.